United States Patent [19]

Suzuki

[11] Patent Number: 4,716,789
[45] Date of Patent: Jan. 5, 1988

[54] DRIVE CONTROL DEVICE FOR VEHICLES

[75] Inventor: Yutaka Suzuki, Zama, Japan

[73] Assignee: Nissan Motor Co., Ltd., Kanagawa, Japan

[21] Appl. No.: 621,185

[22] Filed: Jun. 15, 1984

[30] Foreign Application Priority Data

Jun. 17, 1983 [JP] Japan .................. 58-109062

[51] Int. Cl.$^4$ ............................................. B60K 41/04
[52] U.S. Cl. ........................................ 74/866; 74/856
[58] Field of Search ................ 74/866, 868, 867, 856, 74/862, 854, 855, 865, 859; 364/424.1

[56] References Cited

U.S. PATENT DOCUMENTS

| | | | |
|---|---|---|---|
| 3,776,048 | 12/1973 | Enomoto et al. | 74/866 |
| 3,922,933 | 12/1975 | Sakai et al. | 74/866 |
| 4,034,627 | 7/1977 | Mizote | 74/866 |
| 4,445,329 | 5/1984 | Drisko | 74/865 X |
| 4,462,276 | 7/1984 | Takano | 74/866 |
| 4,463,822 | 8/1984 | Tanigawa et al. | 74/866 X |
| 4,471,437 | 9/1984 | Yoshino et al. | 74/866 X |
| 4,481,843 | 11/1984 | Jarvis et al. | 74/866 |
| 4,481,844 | 11/1984 | Ironside et al. | 74/866 |
| 4,486,838 | 12/1984 | Itoh et al. | 74/866 X |
| 4,497,223 | 2/1985 | Maruyama et al. | 74/866 |

FOREIGN PATENT DOCUMENTS

| | | | |
|---|---|---|---|
| 3026742 | 2/1982 | Fed. Rep. of Germany | 74/866 |
| 3304442 | 8/1983 | Fed. Rep. of Germany | 74/864 |
| 0037144 | 3/1982 | Japan | 74/866 |
| 58-121713 | 7/1983 | Japan . | |
| 2030661 | 4/1980 | United Kingdom | 74/866 |

Primary Examiner—Leslie Braun
Assistant Examiner—David Novais
Attorney, Agent, or Firm—Schwartz, Jeffery, Schwaab, Mack, Blumenthal & Evans

[57] ABSTRACT

In a vehicle equipped with an automatic transmission, the controller of the automatic drive system includes an operation signal generating circuit which outputs a signal that indicates the controller itself being in operation, and the controller of the automatic transmission includes a transmission control releasing circuit which releases the normal transmission control upon receipt of the signal from the operation signal generating circuit. The operation signal generating circuit outputs a signal which indicates that the automatic drive system is in operation, and due to releasing the regular transmission control of the automatic transmission, a shift down of the vehicle speed from the over-drive speed is performed only in such a condition in which the vehicle speed is decreasing in spite of the full opening of the throttle valve.

13 Claims, 3 Drawing Figures

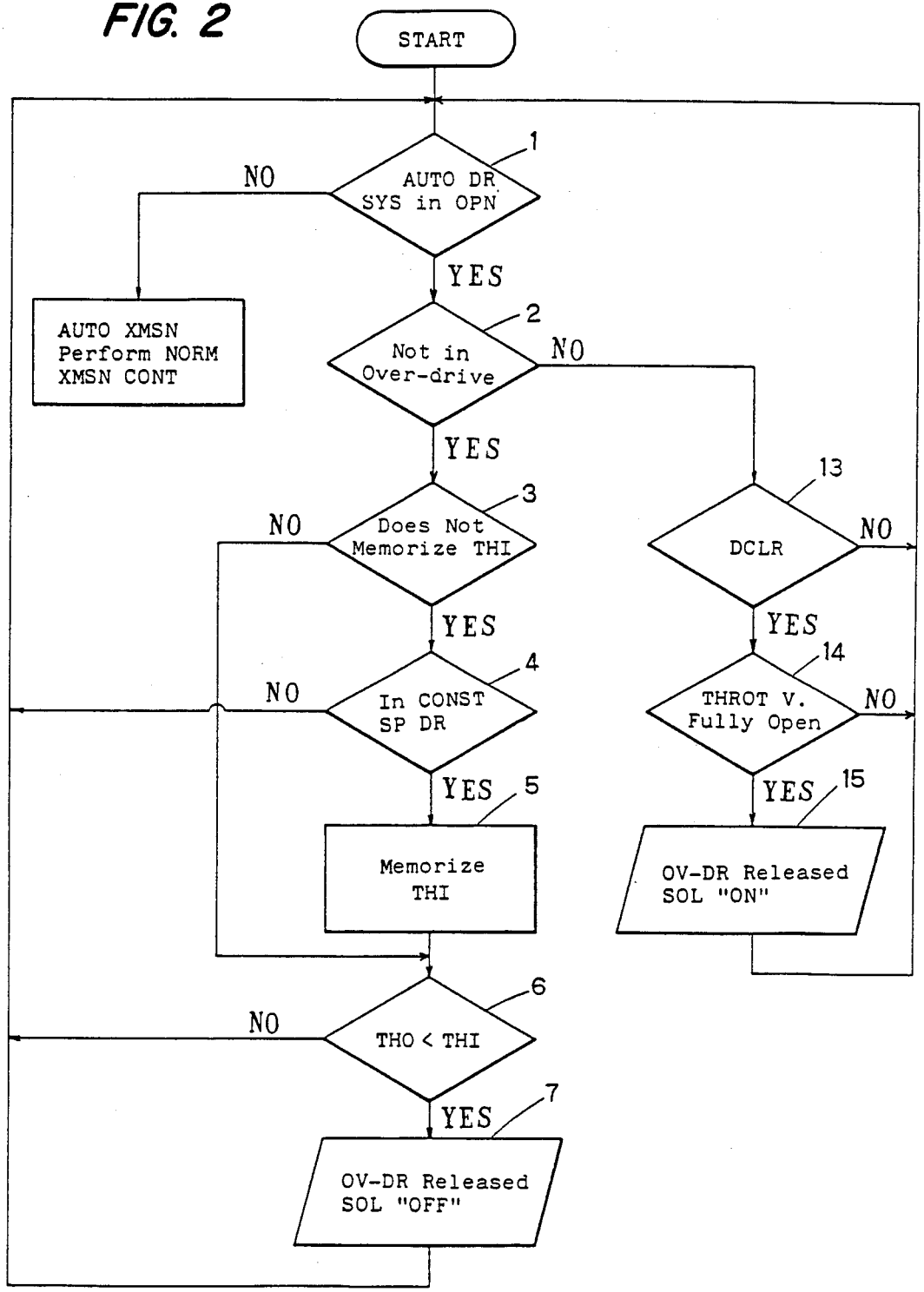

DRIVE CONTROL DEVICE FOR VEHICLES

BACKGROUND OF THE INVENTION

1. Field of the Invention

The present invention relates to a drive control device which is provided with an electronic automatic transmission and an automatic drive system.

2. Description of the Related Art

An example of an prior art drive control device is disclosed in Patent Published Application No. 58-121713/1983. The drive control device in the Patent application includes a vehicle speed signal generating circuit which outputs a signal corresponding to the speed of a vehicle having an automatic transmission, a vehicle speed setting device which sets up speed of the vehicle to a constant value, a set speed signal output circuit which outputs the set speed signal when the speed is set by the vehicle speed setting device, and a comparator which compares the signal from the set speed signal output circuit and the signal from the vehicle speed signal generating circuit to output a signal corresponding to the difference between the two. The drive control device further includes a throttle valve control device which controls the opening and closing of the throttle valve corresponding to the output signal from the comparator. The drive control device is further provided with a speed maintenance detection circuit. The circuit compares the value that is set by the gear position of the automatic transmission corresponding to the vehicle speed set by the vehicle setting device and the value of the output signal of the vehicle speed comparator. The circuit outputs a signal when the output signal value of the comparator exceeds the set value. A timer outputs a signal for a predetermined period based on the output from the speed maintenance detection circuit. A shift-down circuit shifts down the gear based on the logical sum of the output signals from the speed maintenance detection circuit and the timer.

In this prior art device, when the load on the engine is increased, for example, in climbing up a slope during a constant speed drive, the gear of the automatic transmission is shifted down by a shift-down signal. Thereby, a reduction in the vehicle speed is avoided and the vehicle speed is constant. At the same time, the shift-down signal is kept for a predetermined period. This means that the hunting of the vehicle is prevented.

However, in such a drive control device, all three of the controls are executed separately. Namely, the control for opening and closing of the throttle valve by means of the automatic drive system, the control of the amount of the throttle valve opening, and the speed control by the automatic transmission based on the vehicle speed are executed separately, independent of each other. Because of this, when a vehicle climbs up a slope with the automatic drive system switched on, the automatic transmission shifts down the gear with opening of the throttle valve by the automatic drive system, in accordance with the regular speed shifting schedule. But the vehicle is kept in an accelerating state for a predetermined period during which the shift-down signal is preserved by the action of the timer. Therefore, when the vehicle reaches the top of the slope prior to the set time of the timer, the throttle valve is kept open in spite of the decrease of load on the engine. This causes an undesirable situation in which the vehicle speed is increased excessively, resulting in an overshooting accelerating state.

SUMMARY OF THE INVENTION

It is an object of the present invention to provide a drive control device for automotive vehicles which allows to prevent completely the occurrence of hunting during a change of vehicle speed.

It is an object of the present invention to provide a drive controlling device which allows to stabilize a constant speed drive by an automatic drive system.

It is an object of the present invention to provide a drive control device which prevents a prolongation of a accelerating condition due to a continued opening of a throttle valve in spite of a decrease of a load on a engine.

Briefly described, these and other objects of the present invention are accomplished by the provision of an improved drive control device which includes an automatic drive system and an automatic transmission. The control part of the automatic drive system includes an operation signal generating circuit for outputing a signal which indicates the operation of the control part. The control part of the automatic transmission includes a transmission control releasing circuit which releases the normal transmission control upon receipt of a signal from the operation signal generating circuit.

BRIEF DESCRIPTION OF THE DRAWING

These and other objects, features, and advantages of the present invention will be more apparent from the following description of a preferred embodiment, taken in conjunction with the accompanying drawings, in which:

FIG. 2 is a flow chart illustrating a operation of the drive control device shown in FIG. 1.

DESCRIPTION OF THE PREFERRED EMBODIMENT

Figure 1:
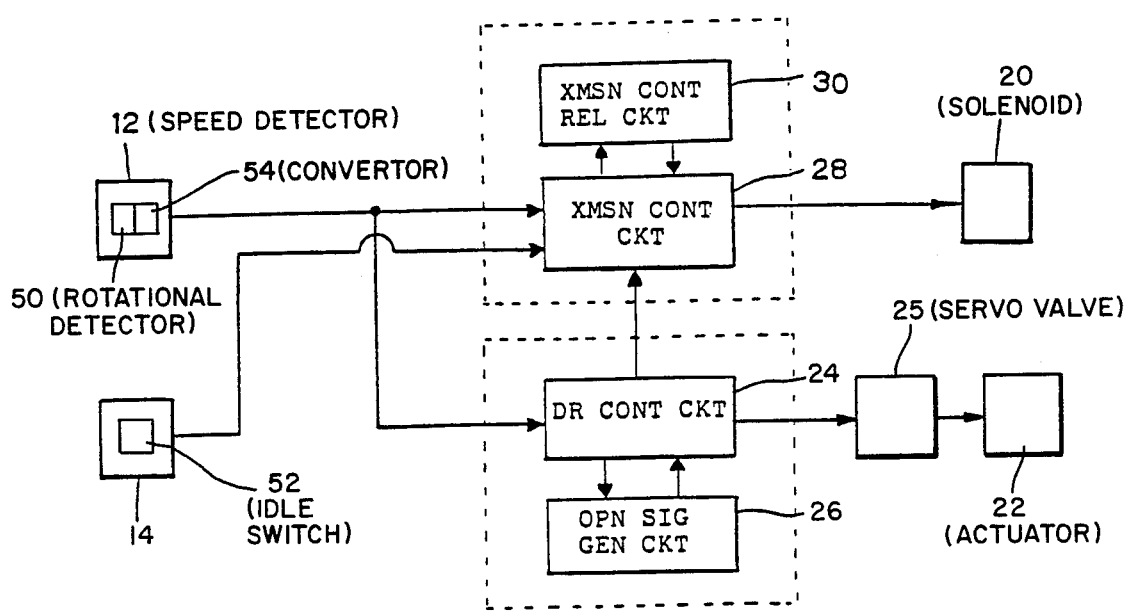
FIG. 1 is a block diagram of a drive control device in accordance with the present invention.

Referring now to FIG. 1, a drive control device embodying the present invention is shown with reference numeral 10. The drive control device 10 is provided with a vehicle speed detector 12, a detector 14 for detecting the extent of the throttle opening, a transmission control circuit 28 for an automatic transmission, a drive controlling circuit 24 for an automatic drive system, a solenoid 20 for releasing over-drive condition, and an actuator 22 for opening and closing the throttle valve. The vehicle speed detector 12 includes a rotational detector (50) which is provided adjacent to an output axis of an automatic transmission and a convertor (54) which converts a pulse output from the rotational detector into a voltage which corresponds to the rotation speed of the rotating axis. Therefore, the vehicle speed detector 12 transmits a signal corresponding to the vehicle speed to the transmission control circuit 28 after detecting the current speed. The throttle opening extent detector 14 includes an idle switch (52) and the like which are employed in the electronic fuel injection device. Therefore, the throttle opening extent detector 14 transmits a signal corresponding to the extent of opening of the throttle valve to the transmission control circuit 28 at the intake port of the engine. The automatic drive system is provided for automatically maintaining a predetermined chosen vehicle speed without operating the accelerator pedal, and comprises the drive controlling circuit 24, a servo valve 25, a solenoid valve 20, the actuator 22 for opening and closing the throttle valve, the vehicle speed detector 12, and various kinds of control switches. The drive controlling circuit 24 memorizes the vehicle speed, and detects the error between the vehicle speed when the circuit 24 is set and the vehicle speed corresponding to the vehicle speed signal from the vehicle speed detector 12. The circuit 24 transmits a controlling electric current to the servo valve (25) to accelerate or decelerate the vehicle in response to the error. The servo valve (25) converts a negative pressure from an intake manifold into a controlled negative pressure which is proportional to the controlling electric current from the circuit 24, and applies the controlled negative pressure to a throttle opening and closing actuator 22. The throttle opening and closing actuator 22 converts the controlled negative pressure from the servo valve into a force for operating the accelerator pedal linkage to control the vehicle speed. When no electric current is passing through the solenoid valve, the solenoid valve releases the system in accordance with the on-off signal from the drive controlling circuit 24 by cutting off the negative pressure to the actuator 22. Further, the control switches include switches such as the set switch which sets the vehicle speed and the main switch for the system.

In addition, the automatic drive system further includes an operation signal generating circuit 26 which outputs a signal indicating that the circuit is in operation. The operation signal generating circuit 26 transmits the operation signal to the transmission control circuit 28 of the automatic transmission. The transmission control circuit 28 controls the transmission according to a predetermined normal speed change schedule upon receipt both of a vehicle speed signal from the vehicle speed detector 12 and a signal from the throttle opening detector 14. A transmission control releasing circuit 30 releases the normal transmission control of the transmission control circuit 28 by receiving an operational signal from the operation signal generating circuit 26.

In FIG. 2, there is a flow chart which illustrates a practical example of control of the transmission control circuit 28 as applied to the over-drive control system of an automatic transmission. The operation is as follows. Upon start of the operation in step 1, decision is made whether the automatic drive system is in operation or not. If the automatic drive system is not in operation, the automatic transmission is controlled according to the normal transmission schedule, whereas if it is in operation, the process proceeds to step 2.

In step 2, whether the gear of the automatic transmission is in the over-drive position is decided, and if the transmission is not in the over-drive position, the process proceeds to step 3. In step 3, whether the extent of throttle opening THI is memorized is decided at the time when a fixed driving speed is achieved after shifting down from over-drive. In step 3, if the extent of throttle opening after shift-down THI is not memorized, the process proceeds to step 4 to decide whether the vehicle is in the constant speed condition. If the constant speed is achieved, it proceeds to step 5 and memorizes the extent of throttle opening at the time as the extent of throttle opening after down shifting THI.

Next, proceeding to step 6, the extent of throttle opening at the present time and the extent of throttle opening THI after shift down are compared, and if the extend of throttle opening at the present time THO is smaller than the extent of throttle opening after shift down THI then the process proceeds to step 7, and in this step, the transmission gear shifts up to over-drive by switching "off" the over-drive releasing solenoid 20. In this way, the process now returns to step 1.

If in step 3, the extent of throttle opening after shift-down THI is memorized, the process proceeds to step 6 by skipping steps 4 and 5. If in step 6 the extent of throttle opening at the present time THO is greater than the extent of throttle opening after shift-down THI or if in step 4 it is decided that the vehicle is not in a cruising condition, the control operates in such a way as to return to step 1 without shifting up to over-drive.

On the other hand, if in step 2 the transmission is in an over-drive condition, the process proceeds to step 13 to decide whether the vehicle is decelerating, and if the vehicle is in a decelerating condition, the process proceeds to step 14. In step 14, whether the extent of throttle opening is full or not is decided, and if the throttle is found fully open, it proceeds to step 15. And the transmission is shifted down from over-drive by switching "on" the over-drive releasing solenoid 20, thus the process goes back to step 1.

Moreover, if in step 13 it is decided that the vehicle is not in a decelerating condition, or if in step 14 it is decided that the extent of throttle opening is not full, the process goes back to step 1 without shifting down the over-drive.

Figure 3:
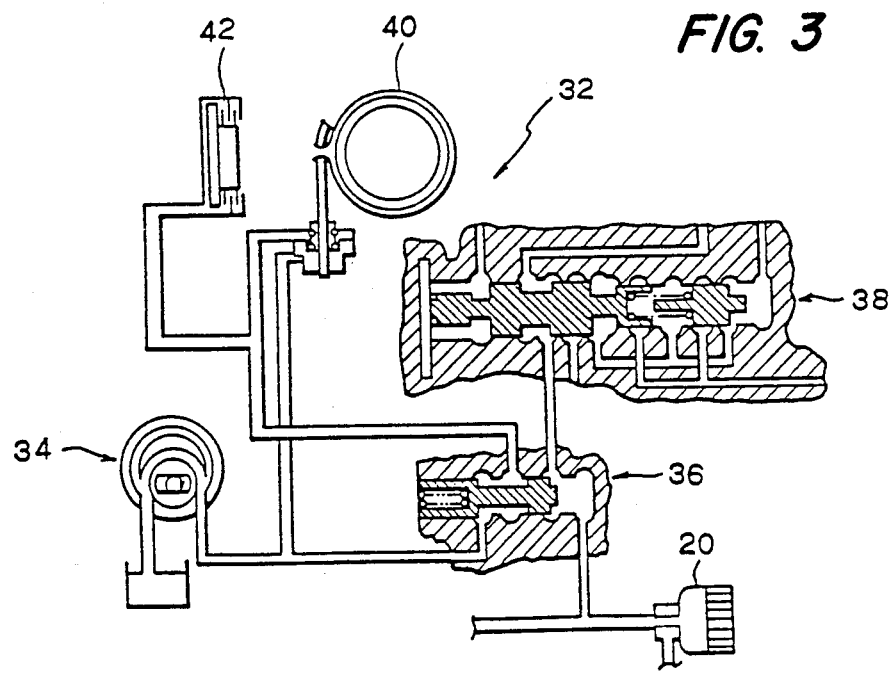
FIG. 3 is a construction diagram of the fluid pressure circuit for the drive control device embodying the present invention.

Referring to FIG. 3, there is shown with reference numeral 32 a practical example of the fluid pressure circuit for the over-drive control in the drive control device 10 as set forth in the foregoing description. The fluid pressure circuit 32 includes a fluid pump 34, an over-drive control valve 36, a third-to-fourth speed shifting valve 38, an over-drive releasing solenoid 20, an over-drive band brake 40, and a direct clutch 42. The over-drive control, where the fourth speed is the over-drive, is aimed at releasing the shift to the fourth speed when an avoidance of frequent shifting from the third speed to the fourth speed in climbing up a slope is desired, when using engine braking at the third speed, or when an accelerating force is needed. The purpose is achieved by operating the over-drive controlling valve 36 via the operation of the over-drive solenoid 20 to control the binding pressure on the over-drive band brake 40 and the direct clutch 42.

Namely, when the over-drive releasing solenoid 20 is switched on according to the control described in the above, the line pressure of the over-drive releasing valve 36 is reduced due to opening of the drain hole on the solenoid 20. As a result, the over-drive controlling valve 36 is pushed toward the right of the figure due to the spring force. This causes the third-to-fourth speed shifting valve 38 to move to the right because of the draining of the line pressure. Therefore the control from the third speed to the over-drive (the fourth) speed is accomplished. On the other hand, when the over-drive releasing solenoid 20 is switched off, the drain hole on the solenoid is closed, applying a line pressure to the right-hand side of the over-drive releasing valve 36. Then, the over-drive controlling valve moves toward the left of the figure. This causes the line pressure to be supplied on the direct clutch 42 and on the open servo side of the over-drive brake 40 to forcibly release the over-drive, completing the control by shifting the speed from the over-drive (the fourth) speed down to the third speed.

Now, the overall operation of this embodiment of the drive controlling device will be described.

When the vehicle starts to drive at a set speed by means of operation of the automatic drive system, the drive controlling circuit 24 sends out a signal to the transmission control circuit 28 of the automatic transmission indicating that the drive controller itself is in operation. Upon receipt of this operation signal, the transmission control circuit 28 abandons the transmission schedule which is predetermined by the vehicle speed signal from the vehicle speed detector 12 and the signal which shows the extent of throttle opening that comes from the detector 14 for the extent of throttle opening. Here, if the vehicle has been driven at the over-drive speed, in spite of the full opening of the throttle valve, only in the decelerating state of the vehicle speed it is possible to shift the speed from the over-drive (the fourth speed) speed down to the third speed by switching "on" the over-drive releasing solenoid 20.

Moreover, if the vehicle has not been driven at the over-drive speed, like in the case after a shifting down of the speed, the vehicle speed can be shifted from the third speed up to the over-drive (the fourth) speed, by switching "off" the over-drive releasing solenoid 20 at the time when the extent of throttle opening returned to the level corresponding to the constant speed.

Furthermore, although a specific illustration was given in this embodiment only about the over-drive control, it is obvious that similar operation can be applied to transmission control at other transmission positions or to transmission control with a plurality of shifting stages.

In summary, according to the present invention the device is constructed to input the signal indicating that the automatic drive system is in operation into the automatic transmission and the regular transmission control of the automatic transmission is to be released during the operation of the automatic drive system, so that in spite of the full opening of the throttle it is possible to shift down the speed automatically only in a state in which the vehicle can be found in a deceleration situation. Following a shift down, the vehicle speed will be shifted up again after the extent of throttle opening is returned to the extent of throttle opening that corresponds to the set vehicle speed, so that there is no possibility of an overshooting of the accelerating condition due to continued opening of the throttle valve, in spite of a reduction in the engine load. This leads to an effect that the hunting phenomenon that may occur at the time of repeated shifting up and down of the vehicle speed can be avoided.

Various modifications will become possible for those skilled in the art after receiving the teachings of the present disclosure without departing from the scope thereof.

What is claimed is:

1. A drive control device including an electronic automatic transmission and an automatic drive system, comprising:
    a first detecting means for detecting a vehicle speed and generating a vehicle speed signal;
    a second detecting means for detecting an extent of a throttle opening and for generating a throttle opening extent signal;
    an actuator for opening and closing a throttle valve;
    a drive controlling circuit for controlling said actuator according to the vehicle speed signal from said vehicle speed detector to maintain a predetermined chosen vehicle speed without operating an accelerator pedal;
    an operation signal generating circuit for outputting an operation signal indicating that said drive controlling circuit is in operation;
    a transmission control circuit for controlling the transmission according to a predetermined normal speed change schedule upon receipt of both said vehicle speed signal from said vehicle speed detector and said throttle opening extent signal; and
    a transmission control releasing circuit for releasing normal transmission control of said transmission control circuit upon receipt of the operation signal from said operation signal generating circuit.

2. A drive control device as claimed in claim 1, further comprising an over-drive control system for said automatic transmission.

3. A drive control device as claimed in claim 2, in which the over-drive control system comprises a fluid pressure circuit which includes a fluid pump, an over-drive control valve, a third-to-fourth speed shifting valve, an over-drive releasing solenoid connected to said transmission control circuit, an over-drive band brake, and a direct clutch.

4. A drive control device as claimed in claim 3, in which said drive control circuit memorizes the vehicle speed and detects the error between the vehicle speed when the drive controlling circuit is set and the vehicle speed corresponding to the vehicle speed signal from said vehicle speed detector, and transmits a signal to said actuator to accelerate or decelerate the vehicle in response to the error.

5. A drive control device as claimed in claim 4 in which said vehicle speed detector comprises a rotational detector which is provided adjacent to an output axis of an automatic transmission and a convertor which converts a pulse output from the rotational detector into a voltage which corresponds to the rotation speed of the axis.

6. A drive control device as claimed in claim 5, in which said throttle opening detector comprises an idle switch which is employed in an electronic fuel injection device.

7. A drive control device as claimed in claim 1, wherein said drive controlling circuit comprises a means for automatically controlling said actuator.

8. A drive control device as claimed in claim 1, wherein said transmission control circuit comprises a means for automatically controlling said transmission.

9. An automatic transmission control device for controlling the transmission of a vehicle comprising:
    a drive controlling means for controlling said automatic transmission so as to maintain a predetermined vehicle speed without operating an accelerator pedal;
    first means for determining if said drive controlling means is activated;
    second means for determining if the transmission is in an over-drive gear;
    third means for determining if the vehicle is decelerating;
    fourth means for determining if a throttle valve of the vehicle is fully opened;
    fifth means, responsive to said first, second, third, and fourth means, for shifting down from said over-drive gear if said drive controlling means is activated, said transmission is in the over-drive gear, the vehicle is decelerating, and the throttle valve is fully open;

sixth means for determining if the vehicle speed is substantially constant;

seventh means for determining if a present throttle opening extent is less than a predetermined value; and eighth means, responsive to said first, second, sixth, and seventh means, for shifting into over-drive if said drive controlling means is activated, the transmission is not in the over-drive gear, the vehicle speed is substantially constant, and the present throttle opening extent is less than said predetermined value.

10. The automatic transmission control device of claim 9, further comprising an over-drive releasing means, and wherein said fifth means for shifting down comprises a means for activating said over-drive releasing means.

11. The automatic transmission control device of claim 10, wherein said over-drive releasing means comprises a solenoid.

12. The automatic transmission control device of claim 9, further comprising an over-drive releasing means, and wherein said eighth means for shifting into over-drive comprises a means for deactivating said over-drive releasing means.

13. The automatic transmission control device of claim 12, wherein said over-drive releasing means comprises a solenoid.

* * * * *